Feb. 1, 1966   J. C. MOISE ETAL   3,232,560
RECOVERABLE SPACE VEHICLE
Filed Feb. 25, 1963
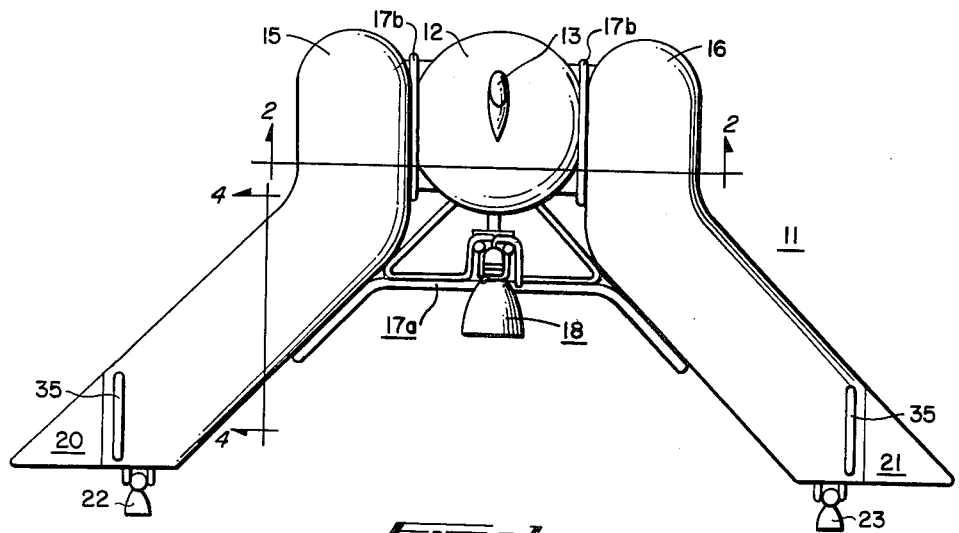
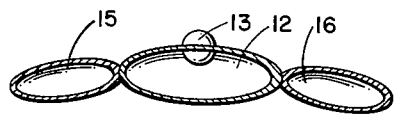
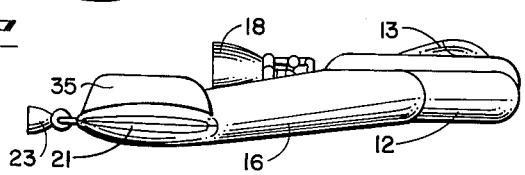
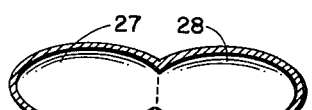
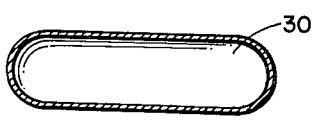
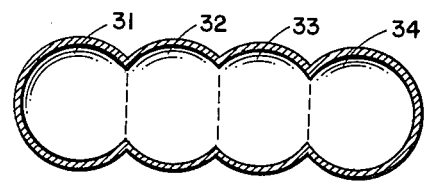
INVENTOR.
JOHN C. MOISE
JOHN E. TILESTON
BY Edward O. Ansell
ATTORNEY

United States Patent Office 3,232,560
Patented Feb. 1, 1966

3,232,560
RECOVERABLE SPACE VEHICLE
John C. Moise, Carmichael, and John Eut Tileston, Sacramento, Calif., assignors to Aerojet-General Corporation, Azusa, Calif., a corporation of Ohio
Filed Feb. 25, 1963, Ser. No. 260,355
3 Claims. (Cl. 244—1)

This invention relates in general to space vehicles and more particularly to a space tanker or freighter which may be recovered and reused.

It is expected that within the next decade space stations will be in use either for military or for scientific purposes or for both. Such space stations will be set up for purposes of refueling space craft, effecting transfer of personnel from one mission to another and for other such uses. It is seen, then, that a vehicle capable of placing these stations in orbit and keeping them supplied, at a minimum total operating cost per pound of payload in orbit, is needed. It is to this latter requirement that the present invention is primarily directed.

Various means have been proposed for conveying large payloads to low orbit space stations, some including water recoverable vehicles and others winged vehicles such as an aerospace plane. However, in expected cost per pound of payload the present invention is greatly superior to any of the above.

The device of the present invention is fundamentally an aerodynamically configured grouping of liquid fuel and liquid oxidizer storage tanks plus propulsion means sufficient to permit vertical take-off, rendezvous and docking at a space station, payload transfer, retro-thrust and re-entry at a shallow angle followed by a controlled glide landing.

Accordingly, it is an object of the present invention to provide a vehicle capable of carrying a significant payload to orbit at a minimum cost.

It is another object of the present invention to provide a vehicle which may be recovered and reused a considerable number of times.

It is a further object of the present invention to provide a vehicle which permits full recovery of the vehicle through a single recovery technique.

Other objects and many of the attendant advantages of this invention will be readily appreciated as the same becomes better understood by reference to the following detailed description when considered in connection with the accompanying drawings, wherein:

FIG. 1 is a plan view of one embodiment of the invention.

FIG. 2 is a sectional view along line 2—2 of the embodiment of FIG. 1.

FIG. 3 is a side elevation of the embodiment of FIG. 1.

FIG. 4 is a sectional view along the line 4—4 of the embodiment of FIG. 1.

FIG. 5 is an alternate configuration for the section of FIG. 4.

FIG. 6 is an alternate configuration for the section of FIG. 4.

FIG. 7 is an alternate configuration for the section of FIG. 4.

FIG. 8 is an alternate configuration for the section of FIG. 4.

The space freighter or tanker of the present invention is primarily seen to be a series of aerodynamically configured tanks capable of generating sufficient lift during re-entry to enable the vehicle to return safely to the earth's surface, and, further, having means for propulsion and attitude control providing the capability of delivering an exceedingly high percentage of its total weight as payload to a space station.

Referring now to FIG. 1, space vehicle 11 is shown having a body portion 12, which includes capsule 13 for housing personnel and control equipment, and winged portions 15 and 16. The wing and body portions are joined by structural sections 17b. Structural section 17a carries main propulsion unit 18. Control surfaces 20 and 21, vector control engines 22 and 23 and vertical stabilizer 35 complete the components of the embodiment of FIG. 1. Additional payload sections, not shown, may be attached forward of body portion 12 and wing portions 15 and 16.

FIG. 2 shows a cross-section of the embodiment of FIG. 1 along line 2—2 and depicts the aerodynamic shape of wing portions 15 and 16 as well as of body portion 12. In FIG. 3 the embodiment of FIG. 1 is seen in side elevation showing the contour of the wing and body portions 16 and 12, respectively, as well as control surface 21, vertical stabilizer 35, and vector control engine 23. A cross section of the swept-back portion of wing portions 15 and 16 is shown in FIG. 4. Alternate configurations for the wing portions are shown in cross section in FIGS. 5, 6, 7, and 8. It is noted that each cross-section provides aerodynamic features as well as structural features for necessary strength and rigidity of the vehicle.

The space vehicle of the present invention therefore comprises basically cylinders or partial cylinders arranged to provide the desired aerodynamic characteristics and maximum structural efficiency.

The body portion 12, which may be of high strength steel, is primarily a liquid oxygen container which may have a cross-section as indicated in FIG. 2 or may be composed of partial cylinders 27 and 28 shown in FIG. 5. The wing portions 15 and 16, which may be of such titanium alloys as A110A, are primarily liquid hydrogen containers and, as the body portion 12, may have cross-sections as indicated in FIG. 2 or be composed of partial cylinders such as 27 and 28 in FIG. 5 or may be configured as the cross-section 19 in FIG. 6, 30 in FIG. 7, or 31, 32, 33, and 34 in FIG. 8.

It is within the concept of the invention that either or both of the wing and body portions may be composed of a plurality of cylinders mounted side by side, presenting a similar configuration to those of FIGS. 5 and 8, and providing a selected amount of lift to the vehicle. It is noted that the propulsion propellant carried in the swept portion of the tankage of this invention must necessarily be of low density to render sufficient the tank lifting surface area and to minimize structural loading. The propellant combination (liquid oxygen/liquid hydrogen) is divided such that the component of lesser volume to be carried is contained in the body portion 12 of the vehicle and the component of greater volume in the wing portions 15, 16 thereof. The minimum vehicle size and consequently payload delivery capability into orbit is determined by the tank dimensions needed to provide safe equilibrium temperatures. On the leading edges of the wing portions 15 and 16, there appears to be no upper size limit.

Aerodynamic pitch plane stability is obtained in the space vehicle by locating the vehicle CG forward of the overall subsonic center of pressure. This is achieved by utilizing the swept tankage of the invention and placing a majority of the heavy components near or on the body portion 12 and the structural sections 17a and 17b. The vertical stabilizers 35 are added to provide vehicle stability in the yaw plane. The vehicle is inherently stable in roll. Attitude control, when needed, is provided by the control surfaces 20 and 21, which are of standard supersonic wing construction. The control surfaces 20 and 21 are protected from spanwise air flow by the vertical stabilizers 35. The attitude control system will also augment control surfaces 20 and 21 if needed.

The tankage arrangement of each configuration provides for high structural efficiency since the recovery system and propellant tankage are integral. The major percentage of the take-off weight is liquid oxygen which is carried in the body portion 12 immediately in front of and closely coupled to the engines. A relatively short load path through the liquid oxygen tank of body portion 12 supports the payload. Second, the low density of hydrogen makes possible the swept wing fuel tank arrangement of wing portions 15 and 16 without inducing severe bending movements at the wing and body junctions. Third, all tankage is a combination of cylindrical, spherical, conical, and ellipsoidal elements resulting in high structural efficiency. Fourth, landing loads are carried through a short distance to the thrust take-out structure.

Further structural efficiency is obtained by pressure stabilizing the entire structure. Those loads which cannot then be withstood by the tankage are resisted by stringers and frames, not shown, distributed throughout the tankage.

The vehicle may be powered by a plurality of engines in lieu of the single engine 18 shown. The engine or engines used may be of the conventional or more advanced types.

Since the present space vehicle configuration involves short main engine thrust vector moments about the center of gravity with long moment arms at the wing tip, it has been equipped with separate vector control engines 22 and 23. Although a single vector control engine has been shown at each wing tip, it is within the concept of the invention to include two or more such engines to provide the desired vector control. It is possible that the vector control engines can be used after main engine shutdown to provide vernier trim, transfer velocity increments, and retrofire capability.

In the space vehicle of the present invention, the total aerodynamic forces permit a very low entry angle trajectory and the maintenance of a high altitude during maximum heating, both resulting in greatly reduced heating rates and "g" forces. An insulation system, not shown, protects the entire vehicle from damage due to heat generated during re-entry. The insulation system also controls heat leakage into the propellants both during the prelaunch period and while the vehicle is in space, and, in addition, serves as a meteoroid barrier and provides adequate damping to prevent damage due to engine and aerodynamic noise.

During the re-entry phase, navigation and control will be performed to insure that the vehicle remains within the landing path corridor and does not exceed thermal design limits.

The attitude control system may be used for retro-impulse by rotating attitude control nozzles in the proper direction for this type of operation.

The present invention is landed like an aeroplane under power-off conditions, such as the X-15 rocket plane, and since the wing loading of the present invention is much lower than that of the X-15, the landing characteristics are expected to be superior to those of the X-15.

The present space vehicle contains a recovery feature in the case of abort in ascent in that as long as propellants can be jetisoned before landing, and if the abort is high enough so that an approach maneuver can be carried out, the vehicle can be saved. Return to launch base is considered feasible in the early flight stages, that is, at vertical velocities up to 3,000 to 4,000 ft./second. Glidedown at a downrange airfield after this phase is also considered feasible.

A reliability of better than 90% in such individual Titan stages as presently exist indicate that a much greater reliability may be realized for the present space vehicle through use of redundancy, utilization of a pilot's decision-making capability, and lack of dependence on such devices as parachutes and retro-rockets for re-entry.

The space vehicle with all the noted capabilities will have a low ratio of empty weight to takeoff weight when compared with other recoverable systems, and an approximately equivalent ratio when compared to present day multistage vehicles.

In comparison with aerospace planes, the vehicle of the present invention uses less hydrogen and has a lower metal parts weight per pound of payload, with recovery and reuse operations similar. Also, for accumulative payload rate the present vehicle is economically superior to an aerospace plane although the aerospace plane is more flexible and can more effectively carry a smaller payload. In comparison with payload delivery vehicles recoverable at sea or in other bodies of water, the present vehicle is superior in that the costs and difficulty of water recovery are considerably greater than for land recovery. It is seen then that the space vehicle of the present invention will economically deliver large unit payloads, at a high payload delivery rate, to low orbit space stations for use there or for transfer to other rocket vehicle systems which carry payload to higher earth orbits or to the moon, or to other planetary objectives.

Obviously many modifications and variations of the present invention are possible in the light of the above teachings. It is therefore to be understood that within the scope of the appended claims, the invention may be practiced otherwise than as specifically described.

We claim:
1. An aerodynamically configured space freighter or tanker capable of vertical takeoff and horizontal landing comprising a body portion including liquid fuel storage means and a crew capsule, a pair of tankage portions having upper and lower surfaces substantially coplanar with the body portion, said tankage portions swept back from said body portion, at least a single-stage booster attached to said body portion for providing thrust to attain orbit and rendezvous, de-orbit retro means for effecting re-entry into the atmosphere at a shallow angle, said retro means providing deceleration thrust during glide after re-entry, and control means for controlling glide path and attitude within a preselected flight corridor.

2. The device claimed in claim 1 wherein said control means includes control surfaces attached to said swept back tankage portions remote from said body portion.

3. The device claimed in claim 1 wherein said de-orbit retro means includes vector control engines attached to said swept back tankage portions at positions remote from said body portion.

References Cited by the Examiner
UNITED STATES PATENTS
2,777,655   1/1957   Graham _____ 244—135
3,147,936   9/1964   Mercille _____ 244—1 X OTHER REFERENCES
Rocket Research by Constantin P. Lent, New York 1945, Figures 18 and 20, 2 pages.
Figures 18 and 20, 2 pages.
Space/Aeronautics Magazine, August 1959, pages 61-63.
Aviation Week Magazine, October 3, 1960, pages 54, 55, 57, 59.

FERGUS S. MIDDLETON, Primary Examiner.
R. DAVID BLAKESLEE, Examiner.
G. P. EDGELL, Assistant Examiner.